US012692423B2

(12) United States Patent (10) Patent No.: US 12,692,423 B2
Bijlard-Jung et al. (45) Date of Patent: Jul. 28, 2026

(54) HYBRID SOLVENT-BORNE POLYURETHANE ADHESIVES

(71) Applicant: Covestro Deutschland AG, Leverkusen (DE)

(72) Inventors: Ann-Christin Bijlard-Jung, Rösrath (DE); Dirk Achten, Leverkusen (DE); Fabian Schuster, Leverkusen (DE); Joerg Tillack, Solingen (DE)

(73) Assignee: Covestro Deutschland AG, Leverkusen (DE)

( * ) Notice: Subject to any disclaimer, the term of this patent is extended or adjusted under 35 U.S.C. 154(b) by 305 days.

(21) Appl. No.: 18/266,044

(22) PCT Filed: Dec. 2, 2021

(86) PCT No.: PCT/EP2021/083867
§ 371 (c)(1),
(2) Date: Jun. 8, 2023

(87) PCT Pub. No.: WO2022/122521
PCT Pub. Date: Jun. 16, 2022

(65) Prior Publication Data
US 2024/0026196 A1    Jan. 25, 2024

(30) Foreign Application Priority Data

Dec. 9, 2020    (EP) .................................... 20212819

(51) Int. Cl.
| | |
|---|---|
| *C09J 175/06* | (2006.01) |
| *C09J 11/04* | (2006.01) |
| *C09J 11/06* | (2006.01) |
| *C09J 175/02* | (2006.01) |

(52) U.S. Cl.
CPC ............. *C09J 175/06* (2013.01); *C09J 11/04* (2013.01); *C09J 11/06* (2013.01); *C09J 175/02* (2013.01); *C09J 2475/00* (2013.01)

(58) Field of Classification Search
CPC . C09J 175/06; C09J 11/04; C09J 11/06; C09J 175/02; C09J 2475/00
See application file for complete search history.

(56) References Cited

U.S. PATENT DOCUMENTS

| | | | | |
|---|---|---|---|---|
| 4,870,129 A | * | 9/1989 | Henning .............. | C08G 18/724 |
| | | | | 524/591 |
| 2005/0256261 A1 | * | 11/2005 | Arndt ................... | C08G 18/283 |
| | | | | 524/591 |
| 2009/0269589 A1 | | 10/2009 | Sommer et al. | |

FOREIGN PATENT DOCUMENTS

| | | |
|---|---|---|
| EP | 0024864 A1 | 3/1981 |
| GB | 1527596 A | 10/1978 |

OTHER PUBLICATIONS

Odian, "Principles of Polymerization Chapter 1: Introduction," 2004, Fourth Edition, pp. 1-38. (Year: 2004).*

* cited by examiner

*Primary Examiner* — Robert S Jones, Jr.
*Assistant Examiner* — Joshua Caleb Bledsoe
(74) *Attorney, Agent, or Firm* — The Webb Law Firm

(57) ABSTRACT

An adhesive composition includes a polyurethane polymer, a solvent and a co-solvent. The polyurethane polymer is an internally and/or externally hydrophilized thermoplastic polyurethane having a mass average molecular weight Mw, as determined by gel permeation chromatography against polystyrene standards using N,N-dimethyl acetamide as the eluent, of ≥50000 g/mol, the solvent is a polar-aprotic solvent such as MEK and the co-solvent is water. The polyurethane polymer, the solvent and the co-solvent are present in such amounts that they form a dispersion. The polyurethane polymer content is ≥10 weight-%, based on the total weight of the composition and the weight ratio of solvent to co-solvent is in a range of ≥1:1 to ≤4:1.

9 Claims, No Drawings

HYBRID SOLVENT-BORNE POLYURETHANE ADHESIVES

CROSS-REFERENCE TO RELATED APPLICATIONS

This application is the United States national phase of International Application No. PCT/EP2021/083867 filed Dec. 2, 2021, and claims priority to European Patent Application No. 20212819.5 filed Dec. 9, 2020, the disclosures of which are hereby incorporated by reference in their entireties.

BACKGROUND OF THE INVENTION

Field of the Invention

The present invention relates to an adhesive composition comprising a polyurethane polymer, a solvent and water. The invention further relates to a method of manufacturing an adhesive composition, a method of adhering two surfaces and to the use of a mixture of a solvent and a co-solvent for dissolving a thermoplastic polyurethane polymer.

Description of Related Art

High molecular weight contact- and/or heat activated solvent-borne polyurethane adhesives and solvent-borne coatings are still widely in use in the DIY, footwear, wood, textile, construction and automotive sector. Their main advantage is their good compatibility with a wide range of substrates. Polyurethane solvent-borne adhesives are typically applied evenly onto both substrates which are to be bonded. A main feature of these adhesive is their ability to provide high initial bond strengths directly after contacting the substrates under pressure. They are further known for their good mechanical properties such as high tensile strength and elongation as well as their elasticity and tough bond lines.

The polyurethane polymers which serve as a basis for high molecular weight solvent-borne polyurethane adhesives are mainly produced using a solution polymerization process. The most common solvent for this process is still toluene, which is difficult to extract entirely from the polyurethane polymer typically supplied as a dry pellet. Therefore, solvent formulations of these high molecular weight polymers often still employ toluene as a co-solvent. Since the solubility of such materials in common solvents at ambient temperatures of e.g. 20° C. is rather low, typically solid contents of only 10-15 weight-% of polymer can be achieved.

Similarly, polyurethane polymers for high molecular weight solvent-borne coatings are typically produced in solvents as well. Common fields of use for these coatings are wood and textile coatings.

Other solvent systems for polyurethanes can be based on ketones such as acetone or methylethyl ketone (MEK). Mixed solvent systems can include MEK and an alcohol. In combination with thickening agents adhesive formulations which are highly viscous or solid at room temperature are described in the prior art.

GB 1527596 A discloses a method of thickening a solution of a film-forming polymer material in a solvent of dielectric constant in the range of 5.0 to 50.0, comprising mixing with said solution at a temperature above room temperature, an alkali metal salt of a $C_{8-36}$ fatty acid and allowing the mixture to cool without substantial agitation.

One example discloses a composition with the ingredients: 20 weight-% of a linear linked polyurethane, 10 weight-% of the alkylphenol resin Alresen PA104, 40 weight-% of methylethyl ketone, 29.7 weight-% of ethanol and 0.3 weight-% of sodium stearate. The procedure is described in the following quote: "Fill the methylethyl ketone into a vessel fitted with a reflux condenser; add the linear linked polyurethane with stirring. After about 2.5 hours when the solution seems to be homogenous add the alkylphenyl resin and continue stirring for ½ hour. Then add the hot solution (20° C.) of sodium stearate in ethanol slowly under stirring and heat the whole mixture to about 60° C. After reaching a fully homogenous mixture allow the resultant mix to cool".

EP 0024864 A1 relates to a synthetic-rubber-based solvent adhesive for use in glue-sticks where the adhesive comprises a solution of: (a) a linear branched-chain polyurethane rubber, (b) a carboxylated butadiene-acrylonitrile rubber, containing at least 50% butadiene by weight, and (c) the reaction product of sorbitol and benzaldehyde in a non-aqueous solvent system. The solvent system may comprise at least-one polar solvent selected from iso-butanol, diacetone alcohol and 2-methoxyethanol and a second solvent selected from methylethyl ketone, ethyl acetone and toluene.

US 2009/269589 A1 discloses block-resistant, radiation-curable coating systems based on high molecular mass, aqueous polyurethane dispersions, a process for preparing them, the use of the coating systems as paints and/or adhesives, and also articles and substrates provided with these paints and/or adhesives.

The present invention has the object of providing a polyurethane solvent-based adhesive composition with good wetting behavior on polymeric substrates, good adhesive strength and a lower VOC content compared to conventional solvent-borne adhesive compositions.

This object is achieved by an adhesive composition as described herein. A method of manufacturing an adhesive composition is described herein and a method of adhering two surfaces is described herein. The use of a mixture of a solvent and a co-solvent for suspending a thermoplastic polyurethane polymer is also described herein. Advantageous embodiments are the subject of the dependent claims. They may be combined freely unless the context clearly indicates otherwise.

DESCRIPTION OF THE INVENTION

Accordingly, an adhesive composition comprising a polyurethane polymer, a solvent and a co-solvent is provided wherein the polyurethane polymer is an internally and/or externally hydrophilized thermoplastic polyurethane having a mass average molecular weight Mw, as determined by gel permeation chromatography against polystyrene standards using N,N-dimethyl acetamide as the eluent, of ≥50000 g/mol, the solvent is a polar-aprotic solvent, the co-solvent is water, the polyurethane polymer, the solvent and the co-solvent are present in such amounts that they form a dispersion and the polyurethane polymer content is ≥10 weight-%, based on the total weight of the composition.

The polyurethane polymer preferably comprises structural units derived from an aliphatic diisocyanate and/or structural units derived from a polyester diol. Linear polyester polyurethanes may be produced produced by reaction of a) polyester diols having a molecular weight above 600 g/mol and optionally b) diols in the molecular weight range of 62 to 600 g/mol as chain extenders with c) aliphatic diisocyanates, while observing an equivalent ratio of hydroxyl groups of components a) and b) to isocyanate groups of component c) of 1:0.9 to 1:0.999, wherein component a) consists to an extent of at least 80% by weight of polyester diols in the molecular weight range of 1500 to 3000 based on (i) adipic acid and (ii) 1,4-dihydroxybutane and/or neopentyl glycol.

It is further preferred that component c) comprises isophorone diisocyanate and also hexamethylene diisocyanate. It is also preferred that the alkanediols b) are selected from the group consisting of: 1,2-dihydroxyethane, 1,3-dihydroxypropane, 1,4-dihydroxybutane, 1,5-dihydroxypentane, 1,6-dihydroxyhexane or a combination of at least two of these in an amount of up to 200 hydroxyl equivalent percent based on component a).

The polyurethanes may also comprise urea groups and therefore also be regarded as polyurethane/polyurea compounds.

The polyurethanes may be of the crystallizing type, i.e. they at least partially crystallize after drying of the dispersion. The crystallizing temperature of the polyurethane material, as determined by DSC at a cooling rate of 20 K/min may be 20° C. or greater, preferably 40° C. or greater.

Examples for suitable polar-aprotic solvents include ketones such as methylethyl ketone or acetone, ethers such as tetrahydrofurane, carbonates such as dimethyl carbonate and esters such as ethyl acetate. If mixtures of polar-aprotic solvents are used, these mixtures are also referred to as "the solvent" in the context of the present invention.

Internally hydrophilized thermoplastic polyurethanes are understood to be those thermoplastic polyurethanes which comprise, via a chemical bond, ionic groups and/or non-ionic hydrophilic groups.

The ionic groups may be either cationic or anionic in nature. Compounds that act as cationic, anionic or non-ionic hydrophilizers include those which comprise, for example, sulphonium, ammonium, phosphonium, carboxylate, sulphonate or phosphonate groups or groups which can be converted by salt formation to the aforementioned groups (potentially ionic groups) or polyether groups, and for example can be incorporated into the polyurethanes via isocyanate-reactive groups present.

The neutralizing agents required for salt formation may be added to the salt-forming groups either in a stoichiometric ratio or in excess. To generate anionic groups, organic bases such as tertiary amines or inorganic bases such as alkali metal hydroxides or ammonia are added. In this case, preference is given to using tertiary amines such as triethyl amine, triethanol amine or dimethylethanol amine. Preferred suitable isocyanate-reactive groups are hydroxyl and amine groups.

Preferred non-ionic hydrophilizers are polyoxyalkylene ethers containing at least one hydroxyl or amino group. These polyethers may contain a proportion of 30% by weight to 100% by weight of units derived from ethylene oxide.

Externally hydrophilized thermoplastic polyurethanes are understood to be thermoplastic polyurethanes which have been combined with emulsifiers. Both ionic emulsifiers such as alkali metal and ammonium salts of fatty acids or of aryl(alkyl) sulphonic acids and non-ionic emulsifiers, for example ethoxylated alkyl benzenes with an average molecular weight of 500 g/mol to 10000 g/mol are suitable. Other examples for suitable emulsifiers are AB and ABA block copolymers of poly(ethylene oxide) and poly(butyl acrylate) or polyethers that have been started on lauryl alcohol.

It is within the scope of the present invention that the emulsifiers migrate from the thermoplastic polyurethane material into the solvent and/or co-solvent.

Combinations of an internally hydrophilized thermoplastic polyurethane and external emulsifiers are also possible.

In the composition according to the invention it is provided that the polyurethane polymer, the solvent and the co-solvent are present in such amounts that they form a dispersion. The discontinuous phase of the dispersion can comprise the polymer and, depending on the solvent and co-solvent system used, solvent and/or co-solvent as well. The continuous phase of the dispersion can comprise the solvent and/or the co-solvent. For example, literature data indicates a homogenous mixture of MEK and water at 20° C. with 11% (mass/mass) of water in MEK. Increasing the proportion of water leads to an increasing phase separation leading to a dispersion of the water phase in solvent.

The assessment of whether a dispersion is formed can be performed by visual inspection with the naked eye. If the composition is milky or turbid, there is a dispersion. On the other hand, if the composition is clear, then there is no dispersion present. Unless specified otherwise, the assessment of the presence of a dispersion is performed at 20° C.

The weight ratio of solvent to co-solvent is in a range of ≥1:1 to ≤4:1. Preferred is a range of ≥2:1 to ≤3:1.

In the composition according to the invention the hydroxyl group content may be 15 weight-%, based on the total weight of the composition. This can be determined by titration according to DIN 53420-1. Total OH contents, expressed as weight-percentages, can also be calculated from the recipe of the formulation as follows:

$$\% \text{ OH of protic } co \text{ solvent} = \frac{f * M_{OH}}{M_{protic\ co\ solvent}} * 100$$

Where: f=number of OH groups per molecule, $M_{OH}$=molar mass of OH (17 g/mol), $M_{protic\ co\ solvent}$=molar mass of protic co solvent (g/mol).

The calculated total OH content [%] of the total formulation equals to:

$$\text{calculated OH content } [\%] =$$
$$\frac{\% \text{ OH of protic } co \text{ solvent} * \text{mass of protic } co \text{ solvent}}{\text{total mass}}$$

In the composition according to the invention the polyurethane polymer content is ≥10 weight-%, based on the total weight of the composition. Preferred is a content of ≥15 weight-% to ≤50 weight-% and more preferred ≥20 weight-% to ≤40 weight-%.

The composition according to the invention can be formulated as a 2-component (2K) adhesive by adding a cross-linker. The cross-linker itself can be internally or externally hydrophilized or even used without hydrophilization. Preferably, in an embodiment, the composition further comprises an aliphatic isocyanate cross-linker. Examples for suitable aliphatic isocyanate cross-linkers include isocyanate-functional isocyanurates, uretdiones, allophanates, iminooxadiazinediones, urethanes and urea of pentamethylene diisocyanate (PDI), hexamethylene diisocyanate (HDI), isophorone diisocyanate (IPDI) and $H_{12}$-MDI as well as the aforementioned diisocyanates themselves, preferred with an isocyanate (NCO) content of the cross-linker of ≥3 weight-%, preferred ≥5 weight-% and more preferred ≥10 weight-%.

The isocyanate content of the full formulation including isocyanates is preferred ≥0.1%, more preferred ≥0.15% and most preferred ≥0.2%.

In another embodiment the composition has a viscosity, as determined by rotational viscosity according to DIN EN ISO 3219 at 23° C. and 30 rpm of ≤10000 mPa s. Preferred are viscosities from ≥10 mPa s to ≤10000 mPa s, more preferred ≥50 mPa s to ≤5000 mPa s and most preferred ≥300 mPa s to ≤3000 mPa s.

The viscosity of the formulation is advantageous for good application properties by e.g. brush, spray or roller application.

In another embodiment the polyurethane polymer has a storage modulus G', measured using a plate/plate oscillation viscosimeter according to ISO 6721-10 at 100° C. and an angular frequency of 1/s, of ≥4 kPa. Preferred are storage moduli of ≥4 kPa to ≤1000 kPa, more preferred ≥50 kPa to ≤800 kPa and most preferred ≥75 kPa to ≤600 kPa.

The storage modulus of the polyurethane polymer contributes to the adhesive properties such as tack and initial bonding strength after drying of the solvent. A too low modulus implicates a too low initial bond strength, whereas a too high modulus implicates insufficient wetting of the desired substrate and the need for a higher pressure during the bonding process which may destroy the substrates.

In another embodiment the polyurethane polymer comprises urea groups. Without wishing to be bound by theory it is assumed that the solvent/co-solvent combination of the invention can effectively break up interactions between urea groups of neighboring polymer chains, thereby dissolving the polyurethanes. Urea groups can be incorporated into the polyurethane by reaction of free NCO groups with water, followed by decarboxylation. This can occur during the production of aqueous polyurethane dispersions. Other means of creating urea groups in the polyurethane are reacting free NCO groups with diamine chain extenders, monoamine chain terminators and/or amino-functional internal hydrophilizers such as sodium 2-[(2-aminoethyl)amino]ethane sulphonate (AAS salt).

The presence of urea groups in the polyurethane polymer can be detected by infrared (IR) spectroscopy. In particular, the following absorption ranges are of interest: 1680-1620 cm$^{-1}$ and 1584-1545 cm$^{-1}$.

Preferably, the polyurethane has a ratio of IR absorption in the ranges of 3040-2770 cm$^{-1}$ (asymmetric CH$_2$, CH$_3$ stretching vibration) to 1680-1620 cm$^{-1}$ of ≥1.5 to ≤4. Additionally or alternatively, the polyurethane has a ratio of IR absorption in the ranges of 3040-2770 cm$^{-1}$ to 1584-1545 cm$^{-1}$ of ≥5 to ≤10. Additionally or alternatively, the polyurethane has a ratio of IR absorption in the range of 3040-2770 cm$^{-1}$ to the sum of the IR absorption in the ranges of 1680-1620 cm$^{-1}$ and 1584-1545 cm$^{-1}$ of ≥1 to ≤3.

In another embodiment the polyurethane polymer has been isolated from an aqueous polyurethane dispersion. This has the advantage that the hydrophilization and the urea groups in the polymer are provided automatically. The isolation of the polymer can be achieved by freezing the dispersion which results in the coagulation of the polyurethane to macroscopic particles. These particles can be filtered and dried to yield the isolated polyurethane polymer.

In another embodiment the solvent comprises methylethyl ketone, ethyl acetate, a mixture of methylethyl ketone and acetone or a mixture of ethyl acetate and acetone. The weight ratio of MEK to water is in a range of ≥1:1 to ≤4:1.

Preferred is a range of ≥2:1 to ≤3:1. In mixtures of MEK or ethyl acetate and acetone, their weight ratio is preferably in a range of ≥1:1 to ≤3:1. The weight ratio of an MEK/acetone or ethyl acetate/acetone mixture to water is in a range of ≥1:1 to ≤4:1. Preferred is a range of ≥1.1:1 to ≤3:1.

Preferably, the compositions according to the invention have a pH range of 4.5 to 9.5, more preferred between 5 to 9, most preferred 6-8.5. If necessary, suitable acids such as e.g. hydrochloric acid, bases such as e.g. amines or buffer solutions such as phosphate buffers can be used in order to adjust the pH according to the desired range.

In another embodiment, the solvent is present in an amount of ≤70 weight-%, based on the total weight of the composition. Preferably the solvent is present in an amount of ≤60 weight-% and more preferred ≤50 weight-%, thus contributing to the increasing efforts from industry to reduce volatile organic compound (VOC) contents in their production.

A further aspect of the invention is a method of manufacturing an adhesive composition comprising providing a polyurethane polymer in a solvent and a co-solvent, wherein the polyurethane polymer is an internally and/or externally hydrophilized thermoplastic polyurethane having a mass average molecular weight Mw, as determined by gel permeation chromatography against polystyrene standards using N,N-dimethyl acetamide as the eluent, of ≥50000 g/mol (preferably ≥50000 g/mol to ≤350000 g/mol), the solvent is a polar-aprotic solvent, the co-solvent is water, the polyurethane polymer, the solvent and the co-solvent are present in such amounts that they form a dispersion and the polyurethane polymer content is ≥10 weight-%, based on the total weight of the composition. The weight ratio of solvent to co-solvent is in a range of ≥1:1 to ≤4:1. Preferred is a range of ≥2:1 to ≤3:1.

For details reference is made to the description of the composition according to the invention. These details apply here as well and will not be repeated in the interest of brevity.

In an embodiment the method further comprises adding an aliphatic isocyanate cross-linker. For details reference is made to the description of the composition according to the invention. These details apply here as well and will not be repeated in the interest of brevity.

In another embodiment the polyurethane polymer comprises urea groups. For details reference is made to the description of the composition according to the invention. These details apply here as well and will not be repeated in the interest of brevity.

In another embodiment the polyurethane polymer comprises structural units derived from an aliphatic diisocyanate and/or structural units derived from a polyester diol. For details reference is made to the description of the composition according to the invention. These details apply here as well and will not be repeated in the interest of brevity.

In another embodiment the polyurethane polymer has been isolated from an aqueous polyurethane dispersion prior to it being provided. For details reference is made to the description of the composition according to the invention. These details apply here as well and will not be repeated in the interest of brevity.

In another embodiment the solvent comprises methylethyl ketone, ethyl acetate, a mixture of methylethyl ketone and acetone or a mixture of ethyl acetate and acetone. The weight ratio of MEK to water is in a range of ≥1:1 to ≤4:1. Preferred is a range of ≥2:1 to ≤3:1. In mixtures of MEK or ethyl acetate and acetone, their weight ratio is preferably in a range of ≥1:1 to ≤2:1. The weight ratio of an MEK/acetone or ethyl acetate/acetone mixture to water is in a range of ≥1:1 to ≤4:1. Preferred is a range of ≥1.1:1 to ≤3:1.

A further aspect of the invention is a method of adhering two surfaces, comprising contacting at least one surface with an adhesive composition according to the invention and joining the surfaces.

A further aspect of the invention is the use of a mixture of a solvent and a co-solvent for dispersing a thermoplastic polyurethane polymer, wherein the polyurethane polymer is an internally and/or externally hydrophilized thermoplastic polyurethane having a mass average molecular weight Mw, as determined by gel permeation chromatography against polystyrene standards using N,N-dimethyl acetamide as the eluent, of ≥50000 g/mol (preferably ≥50000 g/mol to ≤350000 g/mol), the solvent is a polar-aprotic solvent, the co-solvent is water and the polyurethane polymer, the solvent and co-solvent are present in such amounts that they form a dispersion. The weight ratio of solvent to co-solvent is in a range of ≥1:1 to ≤4:1. Preferred is a range of ≥2:1 to ≤3:1. For details reference is made to the description of the composition according to the invention. These details apply here as well and will not be repeated in the interest of brevity. It is emphasized that the polyurethane polymer content in the dispersion may be ≥10 weight-%, based on the total weight of the dispersion. Preferred is a content of ≥15 weight-% to ≤50 weight-% and more preferred ≥20 weight-% to ≤40 weight-%.

In an embodiment the solvent comprises methylethyl ketone or a mixture of methylethyl ketone and acetone. For details reference is made to the description of the composition according to the invention.

These details apply here as well and will not be repeated in the interest of brevity.

EXAMPLES

The present invention will be further described with reference to the following examples without wishing to be limited by them.

Methods

The room temperature (RT) was 23° C. Unless noted otherwise, all percentages are weight percentages based on the total weight.

Viscosities were measured as rotational viscosities according to DIN EN ISO 3219 on a Brookfield viscosimeter at 30 rpm with a LV 1 to 4 spindle depending on expected viscosity. For samples that formed gels a notional viscosity of >50000 mPas was postulated.

The storage modulus (G') was measured using a plate/plate oscillation viscosimeter according to ISO 6721-10 at 100° C. and an angular frequency of 1/s.

The mass average molecular weight Mw was determined by size exclusion gel permeation chromatography (GPC) using N,N-dimethylacetamide (DMAc) at 60° C. as eluent. Analysis was carried out on a SECurity GPC-System from PSS Polymer Service at a flow rate of 1.0 mL/min, columns PSS GRAM with an RID detector. Samples of polystyrene with known molecular mass were used for calibration.

Mass losses in grams per minute were determined by recording the weight difference by balancing the 2.0 g of the samples into PP open containers with a diameter of 36 mm (t=0 min) and the residual weight after 2 minutes stored in a fume hood at 23° C. with a relative humidity of 30%. Mass loss of deionized water (2.00 g) served as a reference and the measurements were repeated 5 times and the average mass loss was found to be 0.005 g/min.

$$\text{Mass loss factor} (MLF) =$$

$$(\text{mass loss of sample} [\text{g/min}])/(\text{mass loss of water} [\text{g/min}])$$

The pH value of the formulations was evaluated by universal pH indicator strips from Fisher Scientific.

Stability tests were carried out by freezing the formulated mixtures (25 mL in a 100 mL Schott glass container) for 60 minutes at −18° C. and subsequent thawing and shaking (1 min by hand) of the formulated mixtures. Thawed samples were classified as stable, if no coagulation was observed.

Wetting behavior was determined by visual examination after applying the samples on PVC strips (containing 30% softener) and PP substrates by a doctor blade (50 μm wet). Wetting behavior was classified after 10 seconds as excellent (1): 100% to 90% of coated substrate area covered and no island formation was observed; acceptable (2): 80 to 90% of coated substrate area covered and no island formation was observed and poor (3): less than 80% of coated substrate area covered and/or the formation of islands was observed.

Materials

Polyester Polyurethane Polymers:

Polymer A was an aliphatic, crystallizing polyester urethane/urea, supplied as a solid powder for adhesive applications with a glass transition temperature of the polymer (DSC, 20 K/min) of −50° C., a melting temperature of the polymer (DSC, 20 K/min) of 49° C., and a storage modulus at 100° C. of 207 kPa and a Mw of 144620 g/mol. Polymer A was hydrophilized internally and externally. Dispersion A was a commercially available aqueous dispersion of polymer A for adhesive applications with a solids content of ca. 50 weight-%.

Polymer A was produced from dispersion A by a 3 step process: 1) Freezing of 1 liter of dispersion A in a 1 liter plastic container at −18° C. for 48 h and thawing at room temperature for 24 h. 2) Filtration of the obtained suspension of a white polymer crumb in water, thereby obtaining a solid material with a water content <20%. 3) Drying of the wet crumb in vacuum at a temperature <40° C. to a water content of <0.5%.

Polymer B was an aliphatic, crystallizing polyester urethane/urea solid powder for adhesive applications with a glass transition temperature of the polymer (DSC, 20 K/min) of −51° C., a melting temperature of the polymer (DSC, 20 K/min) of 49° C., and a storage modulus at 100° C. of 77.4 kPa and a Mw of 91895 g/mol. Polymer B was hydrophilized internally and externally. Dispersion B was a commercially available aqueous dispersion of polymer B for adhesive applications with a solids content of ca. 50 weight-%. Polymer B was produced from dispersion B in the same manner as described in connection with polymer A/dispersion A.

Polymer D was an aliphatic, crystallizing polyester urethane/urea solid powder for adhesive applications with a glass transition temperature of the polymer (DSC, 20 K/min) of −51° C., a melting temperature of the polymer (DSC, 20 K/min) of 49° C., and a storage modulus at 100° C. of 503 kPa and a Mw of about 341210 g/mol. Polymer D was hydrophilized internally and externally. Dispersion D was a commercially available aqueous dispersion of polymer D for adhesive applications with a solids content of ca. 50 weight-%. Polymer D was produced from dispersion D in the same manner as described in connection with polymer A/dispersion A.

Hybrid solvent compositions were prepared according to the table below. Examples according to the invention are denoted with an asterisk (*).

Hybrid solvent-borne 1K adhesive formulations were prepared according to procedures a), b) or c):

a) Providing the polyurethane dispersion in 500 mL glass screw-top bottles and subsequent addition of the desired solvent mixture under magnetic stirring until a mixture was obtained.

b) In 500 mL glass screw-top bottles, adding the solid polymer into the desired solvent mixture and shaking on a shaker at a rate of 160 rpm.

c) Providing the polyurethane dispersion in 500 mL glass screw-top bottles and subsequent addition of the desired solvent mixture as well as the desired amount of solid polymer under magnetic stirring until a mixture was obtained.

Experimental results are summarized in the following tables. Inventive examples are noted with (*).

| Experiment No. | 1 | 2 | 3 | 4 | 5 | 6* | 7 | 8* | 9* | 10* | 11* | 12 | 13* | 14* | 15 | 16 | 17 | 18* | 19* | 20* | 21* |
|---|---|---|---|---|---|---|---|---|---|---|---|---|---|---|---|---|---|---|---|---|---|
| Polymer B [g] | 15 | 15 | 20 | | | 25 | 25 | 25 | 25 | 25 | 30 | 35 | | | | | | 5 | | 25 | 25 |
| Polymer A [g] | | | | 20 | | | | | | | | 25 | | | | | | | | | |
| Polymer D [g] | | | | | 20 | | | | | | | | | 20 | | | | | | | |
| Dispersion B [g] | | | | | | | | | | | | | | | 100 | | | 40 | 50 | | |
| Dispersion A [g] | | | | | | | | | | | | | | | | 100 | | | | | |
| Dispersion D [g] | | | | | | | | | | | | | | | | | 100 | | | | |
| 2-Butanone (MEK) | 85 | 80 | 80 | 80 | 80 | 25 | 33.5 | 30 | | 50 | 20 | 15 | 25 | 30 | | | | 27.5 | 25 | | |
| Acetone | | | | | | 25 | 33.5 | 30 | 50 | | 20 | 15 | 25 | 30 | | | | 27.5 | 25 | 33.3 | 40 |
| Ethyl acetate | | | | | | | | | | | | | | | | | | | | 16.7 | 10 |
| Water | | 5 | | | | 25 | 8 | 15 | 25 | 25 | 30 | 35 | 25 | 20 | | | | (20) | (25) | 25 | 25 |
| Solid content [%] | 15 | 15 | 20 | 20 | 20 | 25 | 25 | 25 | 25 | 25 | 30 | 35 | 25 | 20 | 50 | 50 | 50 | 25 | 25 | 25 | 25 |
| Preparation method | b) | b) | b) | b) | b) | b) | b) | b) | b) | b) | b) | b) | b) | b) | n.a. | n.a. | n.a. | c) | a) | b) | b) |

Inventive examples 18 and 19 make use of the aqueous dispersion B which had a solids content of ca. 50 weight-%. Therefore, example 18 with 40 weight-% of dispersion B contains about 20 weight-% of water. The same applies to inventive example 19 having about 25 weight-% of water. These values are given in parentheses in the preceding table.

| Experiment No. | 1 | 2 | 3 | 4 | 5 | 6* | 7 | 8* | 9* |
|---|---|---|---|---|---|---|---|---|---|
| Appearance | clear | clear | clear | clear | clear | milky-white | clear | turbid | milky-white |
| Brookfield viscosity 30 rpm @ 23° C. | 4300 | 90 | gel | gel | gel | 980 | 860 | 940 | 90 |
| pH | 6 | 6 | 6 | 6 | 6 | 5 | 5 | 5 | 7 |
| MLF | 6 | 7 | n.a. | n.a. | n.a. | 7 | 8 | 7 | 12 |
| Stability after freezing & thawing | stable | stable | stable | stable | stable | stable | stable | stable | unstable |
| Wetting behavior on PVC (30% softener), after 10 s | 1 | 1 | n.a. | n.a. | n.a. | 1 | 1 | 1 | 1 |
| Wetting behavior on PP after 10 s | 1 | 1 | n.a. | n.a. | n.a. | 2 | 1 | 1 | 1 |

| Experiment No. | 10* | 11* | 12 | 13* | 14* | 15 | 16 | 17 | 18* | 19* | 20* | 21* |
|---|---|---|---|---|---|---|---|---|---|---|---|---|
| Appearance | milky-white | milky-white | milky-white | milky-white | milky-white | milky-white | milky-white | milky-white | milky-white | milky-white | milky-white | milky-white |
| Brookfield viscosity 30 rpm @ 23° C. | 920 | 1105 | precipitates | 2100 | 7850 | 158 | 54 | 221 | 771 | 310 | 1564 | 144 |
| pH | 5 | 5 | 6 | 5 | 5 | 7 | 7 | 7 | 5 | 6 | 7 | 6 |
| MLF | 5 | 6 | n.a. | 6 | 7 | 1 | 1 | 1 | 8 | 9 | 7 | 10 |

-continued

| Experiment No. | 10* | 11* | 12 | 13* | 14* | 15 | 16 | 17 | 18* | 19* | 20* | 21* |
|---|---|---|---|---|---|---|---|---|---|---|---|---|
| Stability after freezing & thawing | stable | stable | n.a. | stable | stable | unstable | unstable | unstable | stable | stable | stable | stable |
| Wetting behavior on PVC (30% softener), after 10 s | 1 | 1 | n.a. | 1 | 1 | 3 | 3 | 3 | 1 | 1 | 1 | 1 |
| Wetting behavior on PP after 10 s | 1 | 2 | n.a. | 2 | 1 | 3 | 3 | 3 | 2 | 2 | 2 | 2 |

From the experimental results it can be seen that the hybrid adhesive compositions according to the invention display a better wetting behavior on low energy surfaces such as PVC and PP as compared to purely water-borne systems.

If the adhesive composition was prepared starting from dry polyurethane material then this has the additional advantage of a longer storage stability of the material. The liquid compositions can be prepared in the desired amount only and immediately prior to the application of the adhesive.

As a consequence of the reduced water content a wider range of substrates can be considered for use together with the compositions according to the invention. This includes substrates which would be affected negatively by purely water-borne adhesives. Likewise, the evaporation speed of the composition is higher than in purely water-borne systems.

In comparison to purely solvent-borne systems the VOC (volatile organic content) of compositions according to the invention is lower. The solid content and the open time can be increased over purely solvent-borne systems. A higher solid content can also be leveraged into a greater dry film thickness of the applied adhesive.

Adhesion tests were performed on 12*2 cm PVC test strips with a plasticizer load of 30% using samples according to comparative examples 1, 2, 15, 16, 17 and according to all inventive samples.

The adhesive samples were brushed onto an 8 cm long section of each substrate amounting with a view to achieving a solid adhesive layer after drying of ca. 0.1 mm. The strips were dried after their application in an hot air oven at 65° C. until the solvent and water had fully evaporated. Two still warm strips, each having been treated with the same adhesive composition, were pressed together for 60 seconds at a pressure of 4 bar. The joined strips were stored for 7 days at 23° C. and 50% humidity and then subjected to a 180° peel test at 20 mm/s.

All specimens achieved an adhesive strength of over 8 N/mm and thus satisfied the demands of a typical footwear application.

The invention claimed is:

1. An adhesive composition comprising a polyurethane polymer, a solvent and a co-solvent,
   wherein the polyurethane polymer is an internally and/or externally hydrophilized thermoplastic polyurethane having a mass average molecular weight Mw, as determined by gel permeation chromatography against polystyrene standards using N,N-dimethyl acetamide as the eluent, of ≥50000 g/mol,
   the solvent is a polar-aprotic solvent,
   the co-solvent is water,
   the polyurethane polymer, the solvent and the co-solvent are present in such amounts that they form a dispersion,
   the polyurethane polymer content is ≥10 weight-%, based on total weight of the composition and
   a weight ratio of solvent to co-solvent is in a range of ≥1:1 to ≤4:1.

2. The composition according to claim 1, further comprising an aliphatic isocyanate cross-linker.

3. The composition according to claim 1, having a viscosity, as determined by rotational viscosity according to DIN EN ISO 3219 at 23° C. and 30 rpm, of ≤10000 mPa s.

4. The composition according to claim 1, wherein the polyurethane polymer has a storage modulus G′, measured using a plate/plate oscillation viscometer according to ISO 6721-10 at 100° C. and an angular frequency of 1/s, of ≥4 kPa.

5. The composition according to claim 1, wherein the polyurethane polymer comprises urea groups.

6. The composition according to claim 1, wherein the polyurethane polymer has been isolated from an aqueous polyurethane dispersion.

7. The composition according to claim 1, wherein the solvent comprises methylethyl ketone, ethyl acetate, a mixture of methylethyl ketone and acetone or a mixture of ethyl acetate and acetone.

8. The composition according to claim 1, wherein the solvent is present in an amount of ≤70 weight-%, based on the total weight of the composition.

9. The composition according to claim 1, wherein the weight ratio of solvent to co-solvent is in a range of ≥2:1 to ≤4:1.

*   *   *   *   *